March 5, 1929.  G. LESPINAT ET AL  1,704,046
PIVOTING HEADLIGHT
Filed March 16, 1928  4 Sheets-Sheet 1
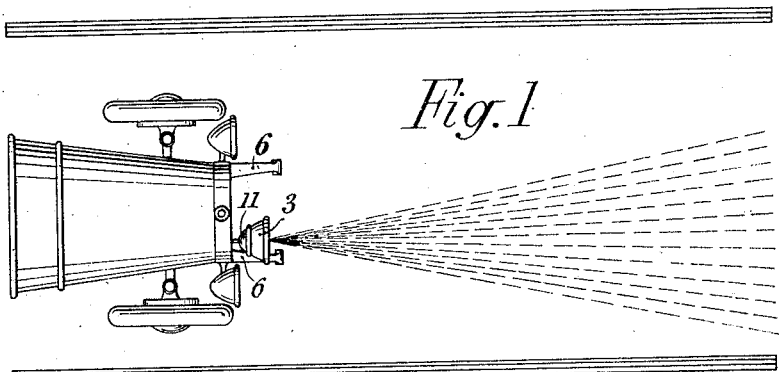
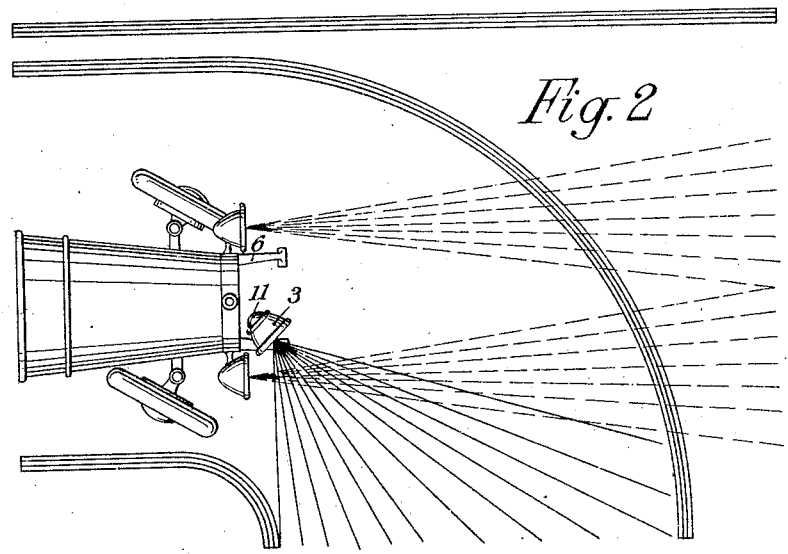
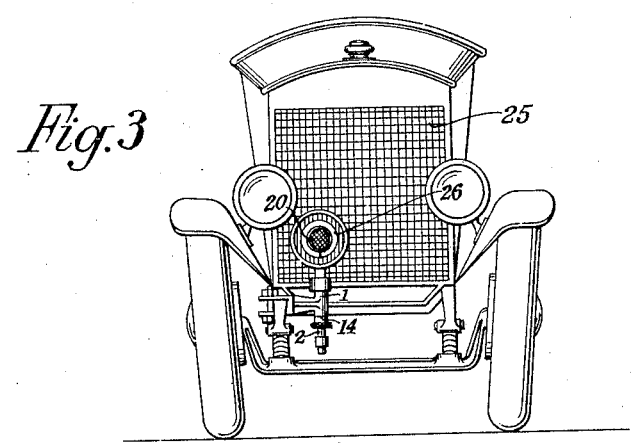

March 5, 1929. G. LESPINAT ET AL 1,704,046
PIVOTING HEADLIGHT
Filed March 16, 1928  4 Sheets-Sheet 2
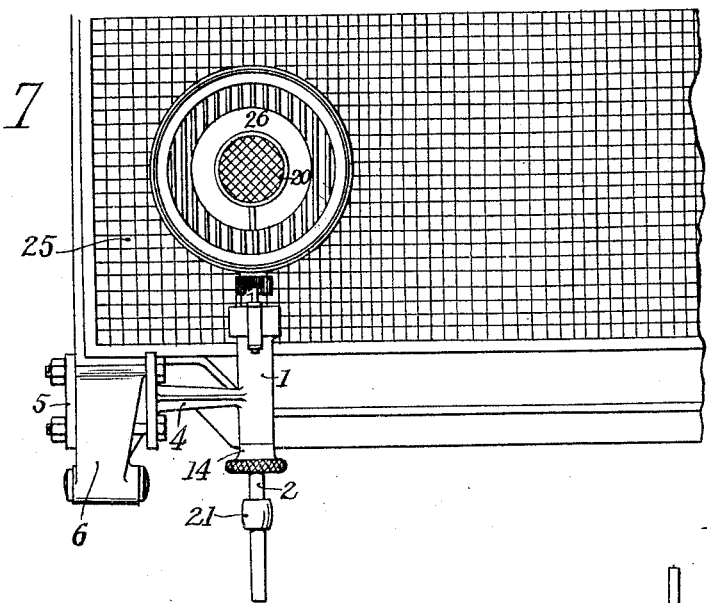
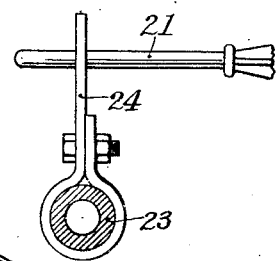
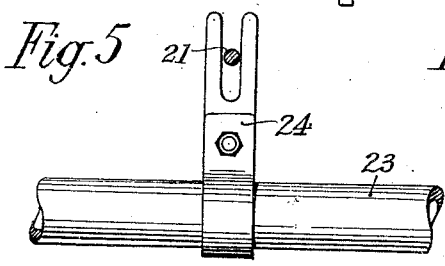
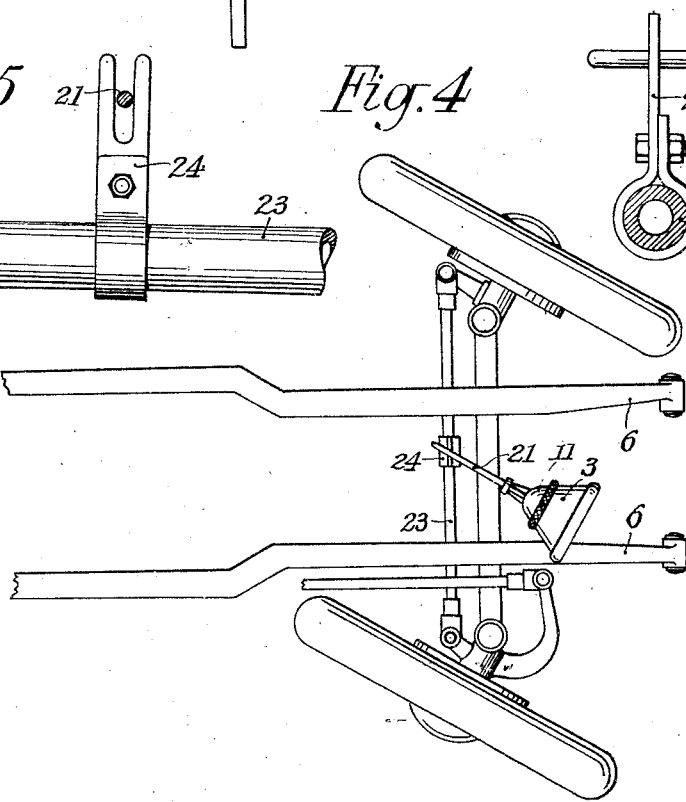

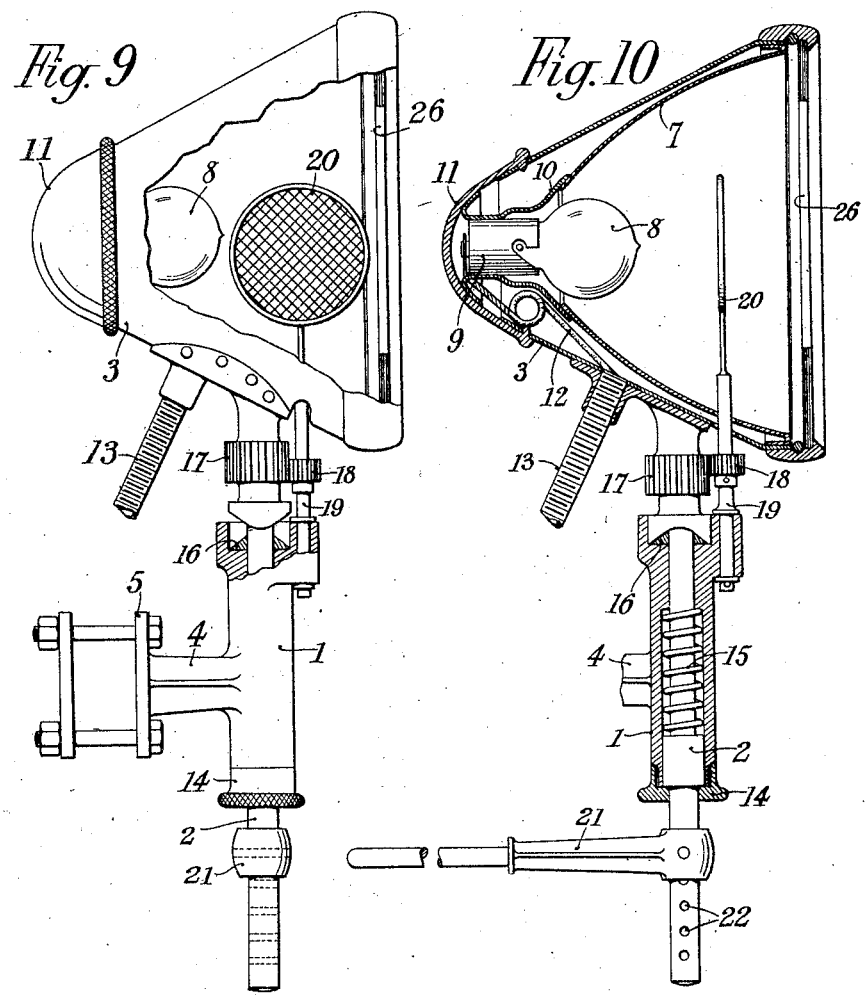

March 5, 1929.  G. LESPINAT ET AL  1,704,046
PIVOTING HEADLIGHT
Filed March 16, 1928   4 Sheets-Sheet 4
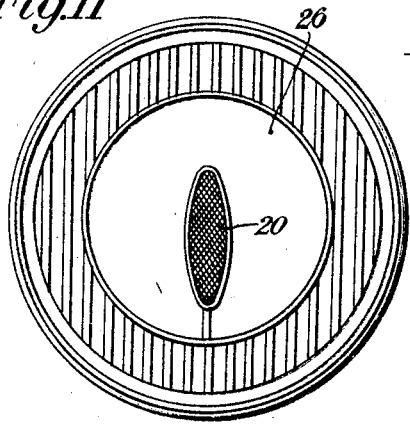
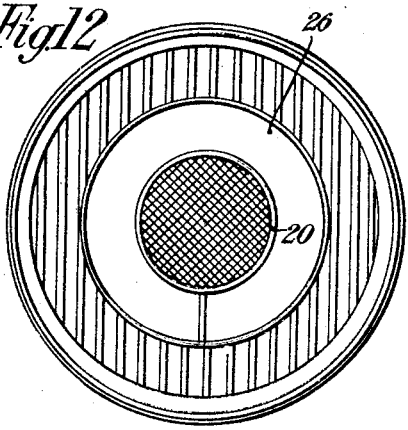
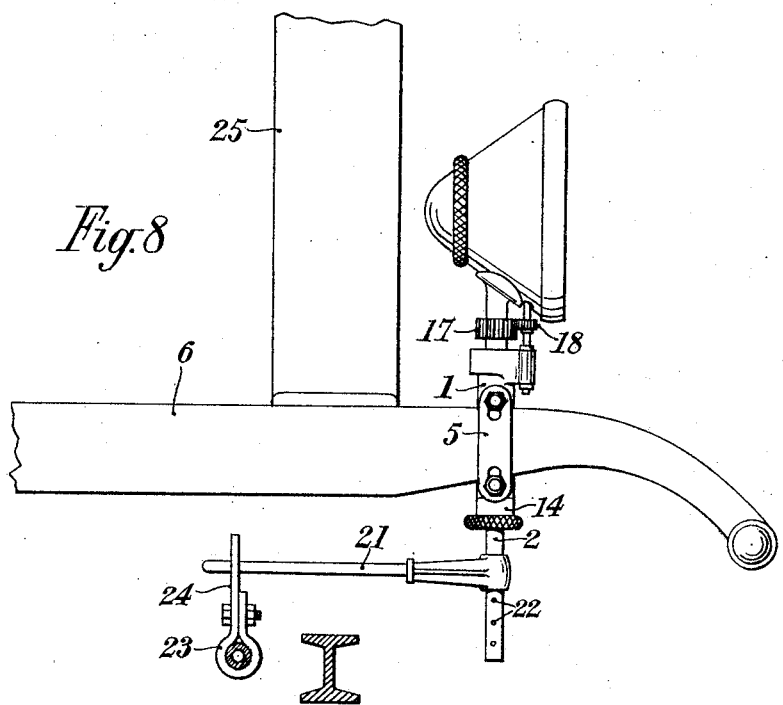
G. Lespinat & E. Kalhaus
INVENTORS
By: Marks & Clark
ATTYS.

Patented Mar. 5, 1929.

1,704,046

UNITED STATES PATENT OFFICE.

GEORGES LESPINAT AND ERNST KALHAÛS, OF PARIS, FRANCE.

PIVOTING HEADLIGHT.

Application filed March 16, 1928, Serial No. 262,282, and in France March 21, 1927.

The present invention relates to improvements in pivoting headlights for motor or other vehicles, in which the headlights are so arranged as to light the road at a great distance without blinding the persons travelling in the other direction, and the inner side of the road will be strongly lighted when making turns on the road, without offering prejudice to the driver of a vehicle travelling in the other direction.

For this purpose, the headlight is suitably connected with the steering gear of the vehicle and is provided with an anti-blinding screen which is pivoted on a supporting axle. When the steering wheels have the straight position, i. e. when they are parallel with the axis of the vehicle, the said screen is placed between the illuminant and the glass of the headlight so as to afford a non-blinding light; when making turns on the road, the said screen rotates on its axis at the same time as the headlight but in the contrary direction, through an angle which has a given relation to the angle of rotation of the headlight, so that the light will be uncovered at the interior of the road turn but will remain covered at the exterior.

The appended drawings show by way of example an embodiment of the invention.

Figs. 1 and 2 are diagrams explaining the operation of the apparatus.

Fig. 3 is a diagrammatic front elevational view of a vehicle provided with a headlight according to the invention.

Fig. 4 is a plan view showing the means for controlling the headlight.

Figs. 5 and 6 are respectively front and side elevational views of a detail, with various parts in section.

Figs. 7 and 8 are views on a larger scale showing front and side elevations of the apparatus relative to the method of mounting it upon the vehicle frame.

Fig. 9 is a view on a larger scale showing a side elevation of the apparatus with parts of the casing and its support broken away.

Fig. 10 is a vertical section, with the anti-blinding screen in another position.

Figs. 11 and 12 are front views corresponding respectively to Figs. 9 and 10.

The said headlight may be employed upon a vehicle either alone or as shown in Figs. 1 and 2 in combination with the usual headlights, and it is mounted below the latter and in front of the radiator. It comprises a support 1 which is apertured for the insertion of the axle 2 upon which it is pivoted and which is secured to the envelope or the casing 3 of the headlight.

The support 1 is secured to an arm 4 provided with a flange 5 which serves to secure the headlight to the front lug of one of the side beams 6, as shown in detail in Figs. 7 and 8.

As in the known types, the headlight comprises a parabolic mirror 7 at whose focus is mounted an electric lamp 8 disposed in a socket 9; said socket is secured to a member 10 joined to the parabolic mirror 7, said member being secured to a back piece 11 connected with the casing 3 by a bayonet joint, so that the lamp can be readily removed at the rear for inspection or renewal, without removing the front disc as is usually the case, with some danger of breaking the glass of the headlight.

The current is supplied to the lamp by a cable 12 which is protected at the exterior of the apparatus by a metallic sheath 13. The glass, shown at 26, is smooth at the central part and fluted at the edges.

The pivot axle 2 of the headlight is lathe-turned in such manner as to form a shoulder which is in contact with a socket 14 screwed to the base of the support 1 and in contact with a spring 15 surrounding the shaft 2; on a second shoulder provided near the top of the said shaft are formed two double ramps having a 30° inclination and coacting with a member 16 of corresponding shape which is mounted in the support.

The said ramps act in co-operation with the spring 15 to assure a fixed and accurate position of the headlight when upon straight road, and to bring the headlight into this position when it has been turned to the right or left. In fact, when it has turned from the normal position shown in Fig. 10 to a position such as is shown in Fig. 9, the axle 2 is raised, this compressing the spring, and under the action of the latter, it tends to return into the first position and to be held therein.

The axle 2 carries a gear wheel 17 engaging a small pinion 18 keyed to a shaft 19 which turns in the support 1 and carries the anti-blinding screen 20 which may consist of a yellow glass; the gear ratio is such that the angular motion of the screen will be double that of the headlight.

The rotation of the headlight is controlled by a lever 21 secured at one of the holes 22 pierced in the axle 2, in such manner that the headlight may be mounted upon vehicles of all types irrespectively of the distance between the vehicle frame and the coupling bar 23; at the centre of this latter is mounted a collar 24 of which one arm, or the longest, is pierced with a slot in which is engaged the end of the lever 21 (Figs. 4, 5, 6 and 8); the length of said lever is such that when the back part of the headlight is at the proper distance from the radiator as shown at 25, the end of the lever will always remain engaged in the slot in the collar 24.

The headlight can rotate through 40°–50° which corresponds to an 80°–90° rotation of the screen 20, but in the major part of the turns on the road, the headlight is rotated only about 30°–35°, so that the said screen will not have the position shown in Fig. 9 in which it is displaced 90° from its normal position (Fig. 10).

The headlight is so constructed that it will light the road for about 70 meters in front of the vehicle, upon a straight road (Fig. 1), and herein it will not be necessary to light both headlights. Due to the fact that the screen 20 is placed between the lamp 8 and the glass 26, the light will not have a glaring or blinding effect upon persons on foot travelling in the opposite direction to the vehicle. When turning on the road, we may, as shown in Fig. 2, light the stationary headlights, and the rotation of the movable headlight—under the control of the straight motion of the coupling bar 23—is such in the major part of the road turns that the screen 20 will never rotate through 90°, and thus the light will be only partially uncovered so as to light the inner side when turning on the road, whilst the light sent to the outer side must pass through the screen 20 and hence will not blind the driver of a vehicle coming in the other direction.

Obviously, the said invention is not limited to the constructional form herein described by way of example, and we may modify the form, disposition and method of mounting the several parts of the headlight without departing from the principle of the invention.

In particular, the headlight may be mounted on the right-hand side beam instead of on the left, and it might even be mounted at any other suitable point of the vehicle, by properly modifying the parts used for the control and the securing of the apparatus.

Having thus described our apparatus, what we claim as new therein, and our own invention, is:—

1. In a pivoting headlight for motor vehicles, the combination of a pivot axle upon which the headlight is mounted, means for rotating said axle, a screen disposed in the interior of the headlight and in front of the lamp, a pivot axle carrying the said screen, a support which is permanently secured to the vehicle frame and in which both pivot axles are rotatable, and means for imparting the rotation of the said pivot axle of the headlight to the pivot axle of the said screen.

2. In a pivoting headlight for motor vehicles, the combination of a pivot axle upon which the headlight is mounted, means for rotating said axle, a screen disposed in the interior of the headlight and in front of the lamp, a pivot axle carrying the said screen, a support which is permanently secured to the vehicle frame and in which both pivot axles are rotatable, a gear wheel mounted on the pivot axle of the headlight, a gear wheel mounted on the pivot axle of the said screen, said gear wheels being in engagement.

3. In a pivoting headlight for motor vehicles, the combination of a pivot axle upon which the headlight is mounted, means for rotating said axle, a screen disposed in the interior of the headlight and in front of the lamp, a pivot axle carrying the said screen, a support which is permanently secured to the vehicle frame and in which both pivot axles are rotatable, means for imparting the rotation of the pivot axle of the headlight to pivot axle of the said screen, a lever mounted on the pivot axle of the headlight, and a fork mounted on the coupling bar of the steering gear of the vehicle, said lever being adapted to engage between the branches of said fork.

In testimony whereof we have hereunto affixed our signatures.

GEORGES LESPINAT.
ERNST KALHAÚS.